(12) United States Patent
Kochhar et al.

(10) Patent No.: US 12,348,418 B2
(45) Date of Patent: Jul. 1, 2025

(54) PER-APPLICATION VIRTUAL PRIVATE NETWORKING

(71) Applicant: VMware LLC, Palo Alto, CA (US)

(72) Inventors: Arjun Kochhar, Atlanta, GA (US); Utkarsh Singh, Karnataka (IN); Huan Wang, Denver, CO (US); Amit Kumar Yadav, Marietta, GA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/358,166

(22) Filed: Jul. 25, 2023

(65) Prior Publication Data
US 2024/0364630 A1 Oct. 31, 2024

(30) Foreign Application Priority Data
Apr. 28, 2023 (IN) .............................. 202341030727

(51) Int. Cl.
*H04L 45/76* (2022.01)
*H04L 43/028* (2022.01)
*H04L 45/74* (2022.01)

(52) U.S. Cl.
CPC ............ *H04L 45/76* (2022.05); *H04L 43/028* (2013.01); *H04L 45/74* (2013.01)

(58) Field of Classification Search
CPC ..... H04L 69/22; H04L 69/16; H04L 12/4633; H04L 63/1425; H04L 63/20; H04L 63/0236; H04L 63/0272; H04L 67/10; H04L 63/0263; H04L 45/74; H04L 63/1416; H04L 63/1408; H04L 67/14; H04L 69/161; H04L 41/0803; H04L 43/16; H04L 47/2483; H04L 61/5007; H04L 63/0227; H04L 67/1001; H04L 45/38; H04L 49/70; H04L 63/029; H04L 67/56; H04L 12/4641; H04L 41/0816; H04L 41/0893; H04L 41/12; H04L 43/08; G06F 9/45558; G06F 21/554; G06F 21/566; G06F 21/552; G06F 2221/034; G06F 21/56; G06F 21/53; G06F 21/52; G06F 21/6218;
(Continued)

(56) References Cited

U.S. PATENT DOCUMENTS

9,094,400 B2 * 7/2015 Barkie ................ H04L 63/0272
10,812,497 B2 * 10/2020 Venkatramani ..... H04L 63/0272
(Continued)

*Primary Examiner* — Djenane M Bayard
(74) *Attorney, Agent, or Firm* — King Intellectual Asset Management (57) ABSTRACT

Disclosed are approaches for providing per-application tunnel access, such as virtual private network (VPN) access, in LINUX based systems. In response to an application requesting a network connection, a process identifier of the application and an inode identifier representing a socket for the network connection are obtained. Then, a kernel space map is updated to include the process identifier of the application and the inode identifier. In response to the application making a network connection request, the inode identifier of the application is obtained based at least in part on a source network address, a source port number, a destination network address, and a destination port number. Then, the kernel space map is queried to obtain the process identifier of the application, wherein the inode identifier is a query parameter. Then, a routing policy is identified based at least in part on the process identifier.

20 Claims, 3 Drawing Sheets

(58) Field of Classification Search
CPC .... G06F 9/4881; G06F 12/1009; G06F 8/656; G06F 9/5016; G06F 21/577; G06F 9/5027; G06F 9/4411; G06F 9/5044; G06F 21/54; G06F 21/567; G06F 2221/033; G06F 8/65; G06F 2009/45587; G06F 21/57; G06F 21/62; G06F 21/6281; G06F 9/4843; G06F 9/54; G06F 2009/45583; G06F 21/55; G06F 2221/2141; G06F 2221/2145; G06F 9/45533; G06F 9/541; G06F 11/3466; G06F 15/173; G06F 21/604; G06F 2221/2113; G06F 9/3877; G06F 9/4406; G06F 9/545; G06F 11/3409; G06F 2201/865; G06F 21/629; G06F 2212/1016; G06F 2212/657; G06F 3/0604; G06F 9/445; G06F 11/3656

See application file for complete search history.

(56) References Cited

U.S. PATENT DOCUMENTS

| | | | |
|---|---|---|---|
| 2013/0133043 A1* | 5/2013 | Barkie | H04L 63/0485 726/4 |
| 2014/0366120 A1* | 12/2014 | Wood | H04L 63/10 726/15 |
| 2019/0020723 A1* | 1/2019 | Kumar | H04L 63/029 |
| 2019/0306282 A1* | 10/2019 | Masputra | G06F 9/44526 |

* cited by examiner

FIG. 3

# PER-APPLICATION VIRTUAL PRIVATE NETWORKING

CROSS-REFERENCE TO RELATED APPLICATIONS

This application claims priority to, and the benefit of, Indian Provisional Patent Application No. 202341030727, entitled "PER-APPLICATION SPLIT-TUNNELED PROXY" and filed on Apr. 28, 2023, which is incorporated by reference as if set forth herein in its entirety.

BACKGROUND

Network tunnels are often used to provide a logical connection between two physically separate networks or systems to form a single logical network. For example, a virtual private network (VPN) may be used to establish a private network across an untrusted, public network using a network tunnel between endpoints. Moreover, a client connected to the VPN can be configured to route all network traffic through the VPN tunnel, including traffic destined for the public Internet, or can be configured in a split-tunnel manner where local network traffic is routed over the VPN while other network traffic is routed across the public Internet.

Some systems, such as computers with LINUX or Unix-based operating systems installed, do not provided fine-grained VPN support. For example, the LINUX kernel does not provide native per-app VPN support. Additionally, the operating system often fails to identify individual applications requesting a network connection. As a result, VPN access normally cannot be provided on a per-application basis. Therefore, all applications have their traffic routed through a VPN connection using the same VPN configuration.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for providing split-tunneled network connectivity on a per-application basis. Network connectivity is often termed as split-tunneled if network traffic can be directed to take different routes based on one or more criteria (e.g., network destination or traffic type). For instance, VPN clients often offer split-tunnel connectivity. As an example, network traffic with a destination to the LAN can be routed through a VPN, while network traffic with a destination to the WAN may be routed through another network interface.

Unfortunately, many operating systems, such as LINUX and other Unix variants, do not provide native support to identify an application requesting access to the network to permit split-tunneled network connectivity on a per-application basis. VPN settings are often per device—all applications are subject to the same VPN settings. If the VPN connection does not permit a split-tunnel, then no applications are able to bypass the VPN. If the VPN connection is a split-tunnel, the same routing rules are applied to all applications installed and executing on the client device.

This can be a problem in some instances because different applications may have different requirements for VPN access. For example, a web-browser may need a split-tunnel VPN so that certain types of traffic are routed through the VPN while other types of traffic are routed directly across the network, bypassing the VPN. These traffic rules could be based on traffic type or destination. Meanwhile, an email client may need all traffic routed across the VPN in order to establish a secure connection with a company's internal email servers.

To address these issues, various approaches to providing a split-tunneled network connection on a per-application basis are provided. The split-tunneled network connection is further performed in a transparent manner, such that applications are unaware that their network traffic is being routed or proxied. Each application installed on a computing device can have traffic routed in a split-tunnel fashion using application specific rules. For example, a web browser could have multiple rules specified for routing traffic across a network tunnel or bypassing the network tunnel based on criteria such as the destination hostname or destination internet protocol (IP) address, while an email client could have a rule specifying that all traffic be routed across the network tunnel.

In one implementation, a flow identification solution is proposed that identifies which application is requesting access to the network connection of the computing system. The flow identification solution is based upon the proc filesystem provided within LINUX and Unix variants that provides runtime system information, such as information about system memory, hardware configuration, and devices mounted to the system, which can include network devices.

In another implementation, the application requesting access to the network connection of a system can be identified using a Berkeley Packet Filter implementation such as eBPF. eBPF is a LINUX kernel feature that permits attachment of a program to gather information from the kernel space that is not exposed through other system calls in a LINUX or Unix environment. eBPF can provide visibility into kernel level activities, such as network connection usage of applications running on the system. Examples of the disclosure provide a mechanism to perform flow identification utilizing eBPF so that the applications requesting access to the network connection of a system can be identified. In either implementation, examples of the disclosure can provide split-tunneled network connectivity on a per-application basis.

In the following discussion, a general description of the system and its components is provided, followed by a discussion of the operation of the same.

Figure 1:
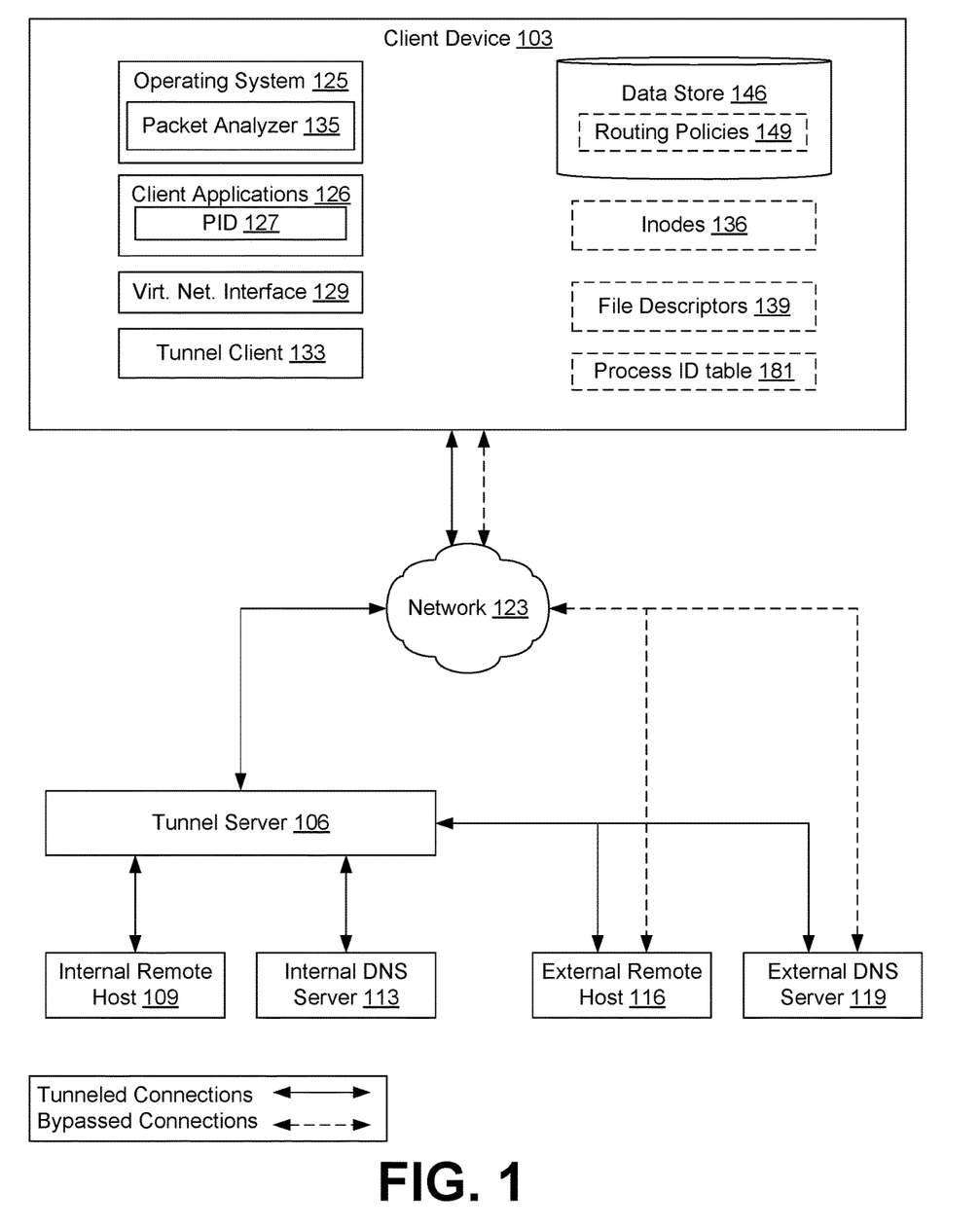
FIG. 1 is a drawing of a network environment according to various embodiments of the present disclosure.

With reference to FIG. 1, shown is a network environment 100 according to various embodiments. The network environment 100 includes a client device 103, a tunnel server 106, an internal remote host 109, an internal domain name service (DNS) server 113, an external remote host 116, and an external DNS server 119, which are in data communication with each other via a network 123. The network 123 can include the Internet, intranets, extranets, wide area networks (WANs), local area networks (LANs), wired networks, wireless networks, or other suitable networks, etc., or any combination of two or more such networks 123. For example, such networks 123 can comprise satellite networks, cable networks, Ethernet networks, and other types of networks.

The client device 103 is representative of any one or more client devices 103 that can be coupled to the network 123, such as a desktop computer, a laptop computer, personal digital assistants, cellular telephones, smartphones, set-top boxes, music players, web pads, tablet computer systems, game consoles, electronic book readers, or other devices with like capability. The client device 103 can include a display, such as liquid crystal display (LCD) displays, gas plasma-based flat panel displays, organic light emitting diode (OLED) displays, electrophoretic ink (E-ink) displays, LCD projectors, or other types of display devices, etc. The client device 103 can be configured to execute various applications, such as an operating system 125 a one or more client applications 126, virtual network interface 129, a tunnel client 133, and a packet analyzer 135.

The operating system 125 can include any system software that manages the operation of computer hardware and software resources of the client device 103. The operating system 125 can also provide various services or functions to computer programs that are executed by the client device 103. For example, the operating system 125 may schedule the operation of tasks or processes by the processor of the the client device 103. The operating system 125 may also provide virtual memory management functions to allow processes executing on the the client device 103 to have its own logical or virtual address space, which the operating system 125 can map to physical addresses in the memory of the client device 103. When referring to the operating system 125, the operating system 125 can include both hypervisors and/or any other system software that manages computer hardware and software resources.

The operating system 125 can include a packet analyzer 135 in some implementations. The packet analyzer 135 can be configured to analyze network traffic that is being sent to the virtual network interface 129 by a client application 126 installed on the client device 103. The packet analyzer 135 can be implemented as a program compiled into bytecode and executed by a virtual machine that is included within the kernel of the operating system 125. The packet analyzer 135 can listen for events occurring within the kernel, such as the use of network resources of the client device 103. In a LINUX or Unix environment, the packet analyzer 135 can be triggered to execute in response to predefined events, such as the invocation of "connect" and "sendmsg" systems calls, or "syscalls," by client applications 126, for getting events from TCP and UDP flows, respectively. Once attached, the LINUX kernel can execute the packet analyzer 135 when the respective syscall is invoked by a client application 126 installed on the client device 103.

The packet analyzer 135 can be instructed to obtain the process identifier or application identifier of a process or client application 126 making the syscall, identify an inode from the socket, and store a mapping between the inode and the process identifier into a data structure such as a hash table.

The packet analyzer 135 can be invoked when the syscall is made by the client application 126, which can guarantee that it is executed before any VPN routing decisions are made by the tunnel client 133. The tunnel client 133 can then query the data structure containing the mapping to make VPN routing decisions.

A client application 126 can access network content or resources made available by the internal remote host 109 or the external remote host 116. Illustrative examples of a client application 126 include a web browser, email client, instant messenger, or a network file storage client. Each client application 126 can be uniquely identified with respect to other client applications 126 by a unique process identifier 127 assigned by the operating system 125 to each client application 126 when it executes.

The virtual network interface 129 can represent any virtual network device provided by the operating system 125 for use by client applications 126. The virtual network interface 129 can be implemented, for example, by using a driver. Examples of virtual network interfaces 129 can include network tunnel (TUN) interfaces, which simulate network layer devices and operate at layer 3 to carry internet protocol (IP packets), and network tap (TAP) interfaces which simulate link layer devices and operate at layer 2 (e.g., to carry Ethernet frames). The virtual network interface 129 can receive packets (e.g. from client applications 126) and forward them to their destination.

The tunnel client 133 can be executed to configure or establish a network tunnel with the tunnel server 106 using the virtual network interface 129. A network tunnel is a point-to-point network connection between two endpoints (e.g., the tunnel client 133 and the tunnel server 106) that allows for network traffic to be encapsulated and sent or routed between the two endpoints. A network tunnel can be established using a variety of approaches, such as virtual private networks (VPNs) or proxy services. A network tunnel may or may not be encrypted, depending on whether encryption is supported by the tunnel protocol or service used. Examples of VPNs include internet protocol security (IPSEC) VPNs, secure sockets layer (SSL) VPNs, and secure shell (SSH) VPNs. Examples of proxy services or connections include SOCKS proxies and application proxies (e.g., HTTP or HTTPS proxies, FTP proxies, SMTP proxies, etc.).

One or more inodes 136 can also be stored on the client device 103. Inodes (index nodes) are data structures that describe file-system objects, such as files or directories. Each inode 136 can represent information associated with a respective file-system object. For example, each file can have a respective inode 136. An inode 136 can store information about a file-system object such as ownership of the file-system object, access permissions, the type of file-system object (e.g., file, directory, etc.), etc. Operating systems 125 such as UNIX, LINUX, or similar operating systems 125 often represent all objects or devices as files, including input/output devices, named pipes, UNIX domain sockets, etc. In these implementations, a separate inode 136 would be assigned for each file that represents an input/output device, named pipe, UNIX domain socket, etc. In some instances, the operating system 125 can also assign inodes 136 to objects that are not typically represented as files, such as anonymous pipes or network sockets. Alternatively, if the operating system 125 represents objects such as anonymous pipes or network sockets with files, then these objects would have inodes 136 associated with them as well.

One or more file descriptors 139 can also be stored on the client device 103. Each file descriptor 139 can represent a process (e.g., client application 126) unique identifier for a file or directory. In implementations where all objects or devices are represented as files, each object or device could have a file descriptor 139 associated with it, such as block or character devices, UNIX domain sockets, named pipes, etc. File descriptors 139 can also be assigned to objects that are not typically represented as files, such as anonymous pipes or network sockets. For example, a client application 126 could have a file descriptor 139 for each network socket or connection in use by the client application 126. On LINUX, the set of file descriptors 139 opened by a process (e.g., a client application 126) is typically accessed using the proc filesystem (procfs).

The process identifier table 181 represents a data structure, such as a hash table, that maps or links an inode 136 to a process identifier 127. The process identifier table 181 can be shared between kernel space and user space so that the packet analyzer 135 running in kernel space can populate the process identifier table 181 and a tunnel client 133 running in user space can access the process identifier table 181 to identify a client application 126 making a network connection based upon a known inode 136 or process identifier 127. The tunnel client 133 can make appropriate system calls provided by the kernel of the operating system 125 to access the process identifier table 181.

For the process identifier table 181, a BPF map can be utilized, such as a hash map that provides a hash table of a defined entry size that can be accessed by an application running in user space as well as eBPF itself. In one example, a least-recently-used variation of the BPF map can be utilized that communicates an identified process identifier to other applications in user space, such as a tunnel client 133 or a client application 126.

Also, various data can be stored in a data store 146 stored on the client device 103. Examples of data stores 146 include relational databases, non-relational databases, object-oriented databases, hierarchical databases or data structures, key-value stores, as well as any area in the memory of the client device allocated to store information related to the implementation of one or more components executed by the client device 103. The data stored in the data store 146 is associated with the operation of the various applications executed by the client device 103, including the operating system 125, the client application(s) 126, virtual network interface 129, tunnel client 133, and/or the packet analyzer 135. The data stored in the data store 146 includes routing policies 149 and potentially other data.

Routing policies 149 are used to decide how to route traffic originating from a client application 126 based on various criteria. Examples of the criteria used to determine how to route the traffic include the type of client application 126 (e.g., web browser, email client, VoIP application, instant messenger, etc.), the identity of the client application 126 (e.g., CHROME®, FIREFOX®, etc.), the type of network traffic (e.g., TCP or UDP, HTTP, FTP, SSMTP, POP3, IMAP, SSL/TLS encrypted, etc.), or the destination of the network traffic (e.g., the IP address or destination hostname). A routing policy 149 can also specify the type of action to be taken based on the matching criteria. Examples of the actions that may be taken can include blocking the network traffic, routing the network traffic through a network tunnel between the tunnel client 133 and the tunnel server 106, or allowing the client application 126 to directly send network traffic to the destination through a bypassed connection.

Multiple routing policies 149 may also apply to the same client application 126. As an illustrative example, a web browser could be subject to multiple routing policies 149. Some routing policies 149 could direct network traffic to particular hostnames or domains through a tunneled connection, while other routing policies 149 could block network traffic to other hostnames or domains. Meanwhile, a default routing policy 149 for the web browser could specify that all other network traffic be routed through a bypassed connection.

Next, a general description of the operation of the various components of the network environment 100 is provided. The following description is only intended to introduce the interactions between the various components of the network environment 100. More detailed descriptions of the various components are provided when discussing the subsequent figures, including alternative implementations of various features, where appropriate.

To begin, a client application 126 makes an attempt to access network content, such as when a web browser attempts to access a web page, a VoIP client attempts to connect to a VoIP service, or an email client attempts to access an email server. The client application 126 can send the request to the virtual network interface 129 (e.g., because the operating system 125 has configured the client application 126 or all client applications 126 to use the virtual network interface 129 to open a network socket or otherwise connect to the network 123). To determine how to route or send the request, the virtual network interface 129 can forward the request or information about the request to a tunnel client 133.

The tunnel client 133 can then determine which routing policy 149 to apply to the network connection. For example, the tunnel client 133 can determine which client application 126 sent the request to the virtual network interface 129, the destination of the network request, the type (e.g., UDP or TCP) or application protocol (e.g., HTTP, SMTP, SSH, DNS, etc.) of the network request, etc. Based on this information, the tunnel client 133 can identify an applicable routing policy 149 and provide the virtual network interface 129 with a routing instruction (e.g., block the request, send the request to the tunnel server 106 over a tunneled connection, send the request over a bypassed connection, etc.). The tunnel client 133 can determine the identity of the client application 126 using various approaches.

In one implementation, the tunnel client 133 can iteratively search the proc filesystem for the process identifier 127 of the client application 126 with a file descriptor 139 that references the inode 136 of the network socket, or the network socket itself. To obtain the inode 136 of the network socket, the tunnel client 133 can invoke or make a system call provided by the operating system 125. For example, the tunnel client 133 could provide the source IP address, source port number, destination IP address, and destination port number as a 4-tuple argument to the system call. In response, the tunnel client 133 could receive the identifier of the inode 136 for the network socket. The tunnel client 133 could then iteratively search the proc filesystem for a process with a file descriptor 139 that references the inode 136 of the network socket. The process identifier 127 of said process would be the process identifier 127 of the client application 126 that made the request. Pseudo-code for the implementation is as follows:

```
finding_pid ( ino ):
    for p in / proc :
        for f in / proc /$p/fd:
            fdpath := / proc /$p/fd/$f;
            if $fdpath is symlink and
            readlink ( $fdpath ) == " socket :[ $ino ]":
                return readlink (/ proc /$p/ exe );
```

The tunnel client 133 could then use the process identifier 127, as well as the source IP address, source port number, destination IP address, and/or destination port number of the request, to identify an applicable routing policy 149.

In another example, a packet analyzer 135 executed by the operating system 125 within kernel space, could be used to identify the client application 126 that made the network request. When the application makes a request to create a network socket, make a network connection, or send a message across the network, the packet analyzer 135 could retrieve the process identifier 127 of the client application 126 and the inode 136 identifier of the inode 136 for the network socket used by the client application 126. The packet analyzer 135 could then save the 2-tuple comprising the process identifier 127 and inode 136 identifier to the process identifier table 181. Subsequently, the tunnel client 133 can provide the source IP address, source port number, destination IP address, and destination port number as a 4-tuple argument to the system call to obtain the inode 136 identifier. The tunnel client 133 can then make a second system call to obtain the process identifier 127 from the process identifier table 181 that matches the inode 136 identifier, thereby allowing the tunnel client 133 to determine which client application 126 is using the network socket for communication.

As previously mentioned, the packet analyzer 135 could be implemented using a Berkely Packet Filter (BPF) or an extended Berkely Packet Filter (eBPF). In these implementations, the packet analyzer 135 can complied to bytecode and executed using a virtual machine embedded within the kernel of the operating system 125. The kernel can utilize a static verifier to guarantee that the program can finish quickly and without unchecked memory access for safe execution in the kernel.

As noted above, in an eBPF implementation, the packet analyzer 135 can listen for events occurring within the kernel, such as the use of network resources of the client device 103. In a LINUX or Unix environment, the packet analyzer 135 can be use a hook that allows for the LINUX kernel and listen for "connect" and "sendmsg" events, for getting events from TCP and UDP flows, respectively. When an event occurs, the LINUX kernel can execute the packet analyzer 135.

Figure 2:
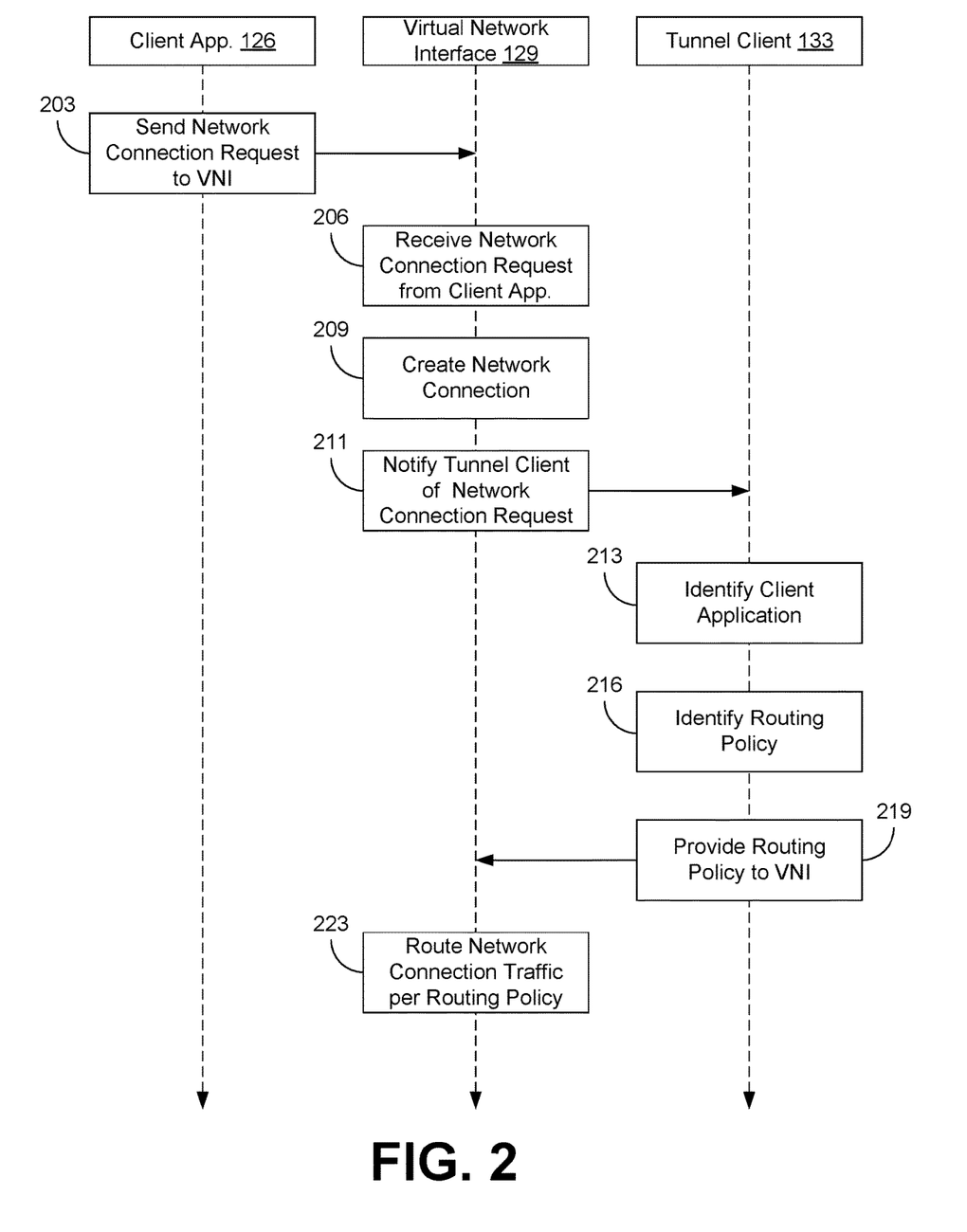
FIG. 2 is a sequence diagram depicting the interactions between the components of the network environment of FIG. 1.

Referring next to FIG. 2, shown is a sequence diagram that provides one example of the interactions between a client application 126, a virtual network interface 129, and a tunnel client 133. The sequence diagram of FIG. 2 provides merely an example of the many different types of functional arrangements that can be employed to implement the operation of the depicted portions of the client application 126, the virtual network interface 129, and the tunnel client 133. As an alternative, the sequence diagram of FIG. 2 can be viewed as depicting an example of elements of a method implemented within the network environment 100.

Beginning with block 203, the client application 126 can sent a network connection request to the virtual network interface 129. For example, the client application 126, having created a network socket, could call a connect function provided by the operating system 125 for the network socket (e.g., the connect function provided by the Berkely Socket API or a similar API) to cause the virtual network interface 129 to establish a network connection. The connect function could take a destination internet protocol (IP) address and a destination port as an argument. The connect function could then cause the virtual network interface 129 to reserve a port on the client device 103 (e.g., a source port). For stateless protocols, such as the universal datagram protocol (UDP), the source port would be reserved for receiving responses to any UDP packets sent using the network socket. For stateful protocols, such as the transmission control protocol (TCP), the connection function could cause a connection to be created between the client application 126 and the specified destination by the virtual network interface 129. The connection could remain alive until the network socket is closed by the client application 126.

Next, at block 206, the virtual network interface 129 can receive the network connection request from the client application 126. For example, the connect function could provide the connection type (e.g., TCP, UDP, etc.) and destination internet protocol (IP) address and destination port number.

Then, at block 209, the virtual network interface 129 can establish the requested network connection for the network socket. For stateless protocols, such as the universal datagram protocol (UDP), the virtual network interface 129 could cause a source port to be reserved for receiving responses to any UDP packets sent using the network socket. For stateful protocols, such as the transmission control protocol (TCP), the virtual network interface 129 could establish a connection between the client application 126 of the client device 103 and the specified destination. Accordingly, the virtual network interface 129 could similarly reserve a source port for the client device 103 side of the network connection. The stateful connection could remain alive until the network socket is closed by the client application 126.

To determine how packets or over network traffic for the client application 126 should be routed using the network connection, the virtual network interface 129 can notify the tunnel client 133 of the network connection request at block 211. This can include providing the destination internet protocol (IP) address and the destination port number specified by the client application 126, as well as the source IP address assigned to the virtual network interface 129 that would be used for the network connection of the network socket and the source port number that would be used for the network connection.

At block 213, the tunnel client 133 can identify the client application that made the network connection request. Accordingly, the tunnel client 133 can iteratively search the proc filesystem for the process identifier 127 of a client application 126 with a file descriptor 139 that references the inode 136 of the network socket, or the network socket itself. To obtain the inode 136 of the network socket, the tunnel client 133 can invoke or make a system call provided by the operating system 125. For example, the tunnel client 133 could provide the source IP address, source port number, destination IP address, and destination port number as a 4-tuple argument to the system call. In response, the tunnel client 133 could receive the identifier of the inode 136 for the network socket. The tunnel client 133 could then iteratively search the proc filesystem for a process with a file descriptor 139 that references the inode 136 of the network socket. The process identifier 127 of said process would be the process identifier 127 of the client application 126 that made the request. Pseudo-code for the implementation is as follows:

---

```
finding_pid ( ino ):
  for p in / proc :
    for f in / proc /$p/fd:
```

```
fdpath := / proc /$p/fd/$f;
if $fdpath is symlink and
readlink ( $fdpath ) == " socket :[ $ino ]":
    return readlink (/ proc /$p/ exe );
```

Then, at block 216, the tunnel client 133 could then use the process identifier 127, as well as the source IP address, source port number, destination IP address, and/or destination port number of the request, to identify an applicable routing policy 149.

Subsequently, at block 219, the tunnel client 133 could provide the routing policy 149 to the virtual network interface 129. However, in some instances, the tunnel client 133 could instead provide routing instructions to the virtual network interface 129 in a format that could be parsed, evaluated, or otherwise interpreted and enforced by the virtual network interface 129.

Proceeding to block 223, the virtual network interface 129 could then route traffic across the network connection according to the routing policy 149 identified by the tunnel client 133. For example, if the routing policy 149 indicated that all traffic from the client application 126 should be routed across a tunneled connection through the tunnel server 106, then the virtual network interface 129 could send network traffic across a tunneled connection. As another example, if the routing policy 149 indicated that traffic from the client application 126 should be blocked, then the virtual network interface 129 could drop, refuse, or reject all packets sent by the client application 126. In some instances, a routing policy 149 could specify that certain types of traffic from the client application 126 should be routed across a tunneled connection to the tunnel server 106, while other types of traffic should be sent across the network 123 using an untunneled or bypassed connection. In similar instances, a routing policy 149 could specify that traffic destined for a particular IP address or range of IP addresses should be routed through a tunneled connection using the tunnel server 106, while traffic destined for other IP addresses or ranges of IP addresses should be routed through an untunneled or bypassed connection. As an illustrative and non-limiting example, a routing policy 149 could specify that all traffic from the client application 126 destined for port 53 (e.g., domain name service (DNS) requests), might be routed to an internal DNS server 113, while all traffic destined for an external remote host 116 is to be routed across the network 123 using a bypassed connection, and all traffic destined for an internal remote host 109 is to be routed through the tunnel server 106 using a tunneled connection. The virtual network interface 129 could route the traffic from the client application 126 accordingly.

Figure 3:
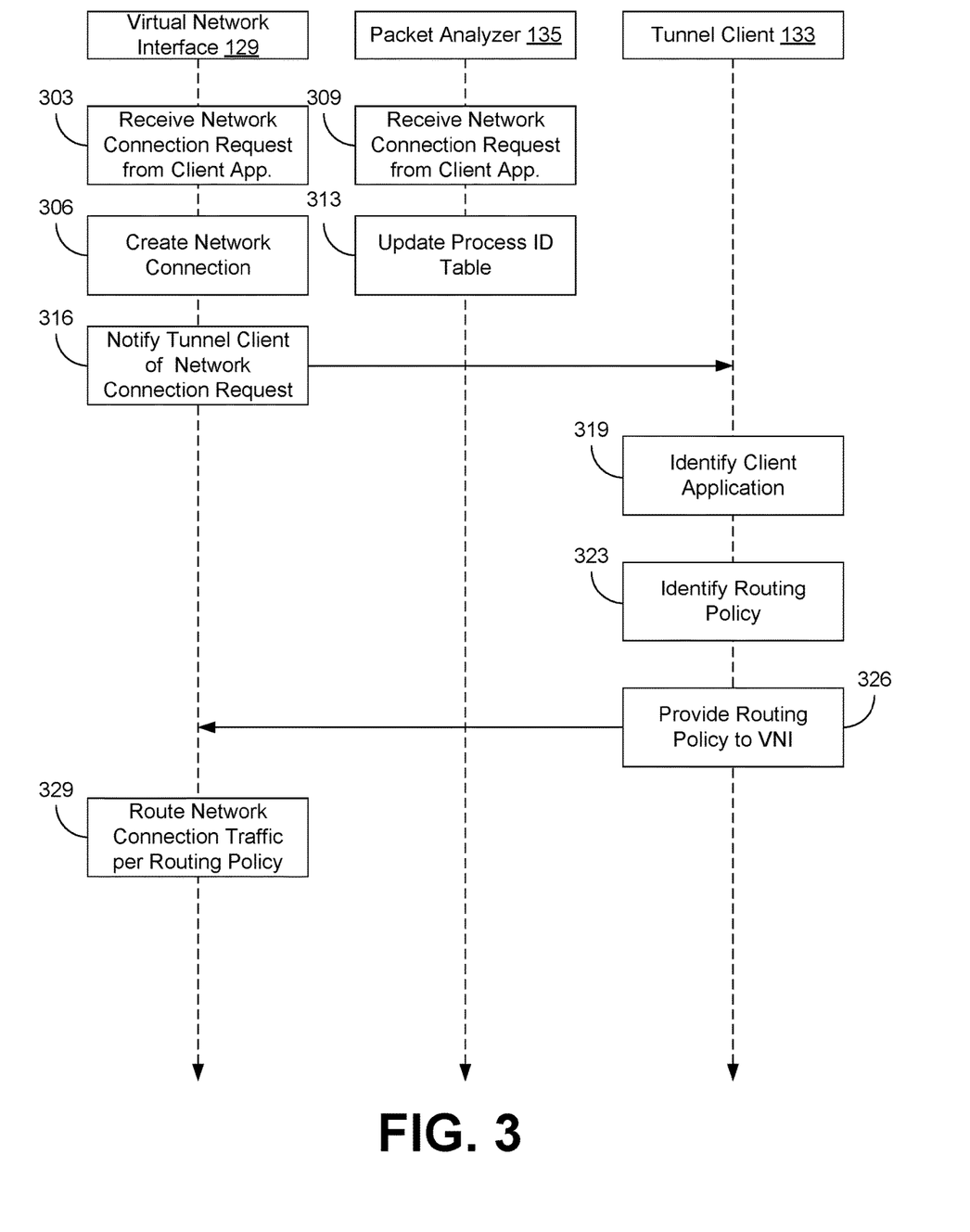
FIG. 3 is a sequence diagram depicting the interactions between the components of the network environment of FIG. 1.

Referring next to FIG. 3, shown is a sequence diagram that provides one example of the operation of the interactions between a client application 126, a virtual network interface 129, a tunnel client 133, and a packet analyzer 135. The sequence diagram of FIG. 3 provides merely an example of the many different types of functional arrangements that can be employed to implement the operation of the depicted portions of the client application 126, the virtual network interface 129, the tunnel client 133, and the packet analyzer 135. As an alternative, the sequence diagram of FIG. 3 can be viewed as depicting an example of elements of a method implemented within the network environment 100.

Beginning with block 303, the virtual network interface 129 can receive a network connection request from the client application 126. For example, a client application 126, having created a network socket, could call a connect function provided by the operating system 125 for the network socket (e.g., the connect function provided by the Berkely Socket API or a similar API) to cause the virtual network interface 129 to establish a network connection. The connect function could take a destination internet protocol (IP) address and a destination port as an argument. The connect function could then cause the virtual network interface 129 to reserve a port on the client device 103 (e.g., a source port). For stateless protocols, such as the universal datagram protocol (UDP), the source port would be reserved for receiving responses to any UDP packets sent using the network socket. For stateful protocols, such as the transmission control protocol (TCP), the connection function could cause a connection to be created between the client application 126 and the specified destination by the virtual network interface 129. The connection could remain alive until the network socket is closed by the client application 126.

Next, at block 306, the virtual network interface 129 can establish the requested network connection for the network socket. For stateless protocols, such as the universal datagram protocol (UDP), the virtual network interface 129 could cause a source port to be reserved for receiving responses to any UDP packets sent using the network socket. For stateful protocols, such as the transmission control protocol (TCP), the virtual network interface 129 could establish a connection between the client application 126 of the client device 103 and the specified destination. Accordingly, the virtual network interface 129 could similarly reserve a source port for the client device 103 side of the network connection. The stateful connection could remain alive until the network socket is closed by the client application 126.

In parallel or substantially parallel to the operations performed at block 303 and/or block 306, the packet analyzer 135 can, at block 309 also receive the network connection request from the client application 126 or otherwise be notified that the client application 126 has made a network connection request. For example, when the client application 126 calls or otherwise invokes the connect function for the network socket created by the virtual network interface 129 for the client application 126, the operating system 125 or the virtual network interface 129 could notify the packet analyzer 135 of the event.

In response, at block 313, the packet analyzer 135 can update the process identifier table 181 to map the connection to the client application 126. For example, the packet analyzer 135 could retrieve the process identifier 127 of the client application 126 that called the connect function and the inode 136 identifier of the inode 136 for the network socket. The packet analyzer 135 could then save the 2-tuple comprising the process identifier 127 and inode 136 identifier to the process identifier table 181.

At block 316, the virtual network interface 129 can notify the tunnel client 133 of the network connection request. This can include providing the destination internet protocol (IP) address and the destination port number specified by the client application 126, as well as the source IP address assigned to the virtual network interface 129 that would be used for the network connection of the network socket and the source port number that would be used for the network connection.

In response, at block 319, the tunnel client 133 can identify the client application 126 that is establishing the connection. For example, the tunnel client 133 can provide the source IP address, source port number, destination IP address, and destination port number as a 4-tuple argument to a system call provided by the operating system 125 to obtain the inode 136 identifier. The tunnel client 133 can then make a second system call to obtain the process identifier 127 from the process identifier table 181 that matches the inode 136 identifier, thereby allowing the tunnel client 133 to determine which client application 126 is using the network socket for communication.

At block 323, the tunnel client 133 could then use the process identifier 127, as well as the source IP address, source port number, destination IP address, and/or destination port number of the request, to identify an applicable routing policy 149.

Next, at block 326, the tunnel client 133 could provide the routing policy 149 to the virtual network interface 129. However, in some instances, the tunnel client 133 could instead provide routing instructions to the virtual network interface 129 in a format that could be parsed, evaluated, or otherwise interpreted and enforced by the virtual network interface 129.

Subsequently, at block 329, the virtual network interface 129 could then route traffic across the network connection according to the routing policy 149 identified by the tunnel client 133. For example, if the routing policy 149 indicated that all traffic from the client application 126 should be routed across a tunneled connection through the tunnel server 106, then the virtual network interface 129 could send network traffic across a tunneled connection. As another example, if the routing policy 149 indicated that traffic from the client application 126 should be blocked, then the virtual network interface 129 could drop, refuse, or reject all packets sent by the client application 126. In some instances, a routing policy 149 could specify that certain types of traffic from the client application 126 should be routed across a tunneled connection to the tunnel server 106, while other types of traffic should be sent across the network 123 using an untunneled or bypassed connection. In similar instances, a routing policy 149 could specify that traffic destined for a particular IP address or range of IP addresses should be routed through a tunneled connection using the tunnel server 106, while traffic destined for other IP addresses or ranges of IP addresses should be routed through an untunneled or bypassed connection. As an illustrative and non-limiting example, a routing policy 149 could specify that all traffic from the client application 126 destined for port 53 (e.g., domain name service (DNS) requests), might be routed to an internal DNS server 113, while all traffic destined for an external remote host 116 is to be routed across the network 123 using a bypassed connection, and all traffic destined for an internal remote host 109 is to be routed through the tunnel server 106 using a tunneled connection. The virtual network interface 129 could route the traffic from the client application 126 accordingly.

A number of software components are stored in the memory of a computing device and are executable by a processor. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory including random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory can include both volatile and nonvolatile memory and data storage components. Volatile components are those that do not retain data values upon loss of power. Nonvolatile components are those that retain data upon a loss of power. Thus, the memory can comprise random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise static random access memory (SRAM), dynamic random access memory (DRAM), or magnetic random access memory (MRAM) and other such devices. The ROM can comprise a programmable read-only memory (PROM), an erasable programmable read-only memory (EPROM), an electrically erasable programmable read-only memory (EEPROM), or other like memory device. Also, the processor can represent multiple processors and/or multiple processor cores and the memory can represent multiple memories that operate in parallel processing circuits, respectively.

The computer-readable medium can represent any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Although the applications or services described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

Although the flowcharts show a specific order of execution, it is understood that the order of execution can differ from that which is depicted. For example, the order of execution of two or more blocks can be scrambled relative to the order shown. Also, two or more blocks shown in succession in the flowcharts can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   an operating system kernel stored in the memory and comprising a first set of machine-readable instructions that, when executed by the processor, cause the computing device to at least:
      in response to an application requesting a network connection, obtain a process identifier of the application and an inode identifier representing a socket for the network connection; and
      update a kernel space map to include the process identifier of the application and the inode identifier; and
   a tunnel client stored in the memory and comprising a second set of machine-readable instructions that, when executed by the processor, cause the computing device to at least:
      in response to the application making a network connection request, obtain the inode identifier of the application based at least in part on a source network address, a source port number, a destination network address, and a destination port number;
      query the kernel space map to obtain the process identifier of the application, wherein the inode identifier is a query parameter; and
      identify a routing policy based at least in part on the process identifier, wherein the routing policy specifies whether the packet is to be routed through a virtual private network (VPN).

2. The system of claim 1, wherein the tunnel client further causes the computing device to apply the routing policy to the network connection.

3. The system of claim 1, wherein the routing policy is further identified based at least in part on the destination network address.

4. The system of claim 1, wherein the routing policy is further identified based at least in part on the destination port number.

5. The system of claim 1, wherein the operating system kernel is a version of the LINUX kernel.

6. The system of claim 5, wherein the second set of the machine-readable instructions of the tunnel client that cause the computing device to obtain the inode identifier further cause the computing device to invoke a system call provided by the LINUX kernel that accepts the source network address, the source port number, the destination network address, and the destination port number as arguments.

7. The system of claim 1, wherein the packet is received from a network tunnel interface.

8. The system of claim 1, wherein the first set of machine-readable instructions comprise an extended Berkely Packet Filter (eBPF) program.

9. A method, comprising:
   in response to an application requesting a network connection, obtaining a process identifier of the application and an inode identifier representing a socket for the network connection;
   updating a kernel space map to include the process identifier of the application and the inode identifier;
   in response to the application making a network connection request, obtaining the inode identifier of the application based at least in part on a source network address, a source port number, a destination network address, and a destination port number;
   querying the kernel space map to obtain the process identifier of the application, wherein the inode identifier is a query parameter; and
   identifying a routing policy based at least in part on the process identifier, wherein the routing policy specifies whether the packet is to be routed through a virtual private network (VPN).

10. The method of claim 9, further comprising applying the routing policy to the network connection.

11. The method of claim 9, wherein the routing policy is further identified based at least in part on the destination network address.

12. The method of claim 9, wherein the routing policy is further identified based at least in part on the destination port number.

13. A non-transitory, computer-readable medium, storing an operating system kernel comprising a first machine-readable instructions that, when executed by the processor of a computing device, cause the computing device to at least:
      in response to an application requesting a network connection, obtain a process identifier of the application and an inode identifier representing a socket for the network connection; and
      update a kernel space map to include the process identifier of the application and the inode identifier; and
   a tunnel client comprising a second set of machine-readable instructions that, when executed by the processor of a computing device, cause the computing device to at least:
      in response to the application making a network connection request, obtain the inode identifier of the application based at least in part on a source network address, a source port number, a destination network address, and a destination port number;

query the kernel space map to obtain the process identifier of the application, wherein the inode identifier is a query parameter; and identify a routing policy based at least in part on the process identifier, wherein the routing policy specifies whether the packet is to be routed through a virtual private network (VPN).

14. The non-transitory, computer-readable medium of claim 13, wherein the tunnel client further causes the computing device to apply the routing policy to the network connection.

15. The non-transitory, computer-readable medium of claim 13, wherein the routing policy is further identified based at least in part on the destination network address.

16. The non-transitory, computer-readable medium of claim 13, wherein the routing policy is further identified based at least in part on the destination port number.

17. The non-transitory, computer-readable medium of claim 13, wherein the operating system kernel is a version of the LINUX kernel.

18. The non-transitory, computer-readable medium of claim 17, wherein the second set of the machine-readable instructions of the tunnel client that cause the computing device to obtain the inode identifier further cause the computing device to invoke a system call provided by the LINUX kernel that accepts the source network address, the source port number, the destination network address, and the destination port number as arguments.

19. The non-transitory, computer-readable medium of claim 13, wherein the packet is received from a network tunnel interface.

20. The non-transitory, computer-readable medium of claim 13, wherein the first set of machine-readable instructions comprise an extended Berkely Packet Filter (eBPF) program.

* * * * *